March 24, 1942. S. F. TRIPLETT 2,277,278
INDICATOR FOR FROZEN CANNED GOODS
Filed Jan. 24, 1939

INVENTOR
S. F. Triplett
BY
ATTORNEY

Patented Mar. 24, 1942

2,277,278

UNITED STATES PATENT OFFICE 2,277,278

INDICATOR FOR FROZEN CANNED GOODS

Stanley F. Triplett, Modesto, Calif.

Application January 24, 1939, Serial No. 252,578

6 Claims. (Cl. 99—192)

This invention relates in general to the frozen canned goods industry, and in particular the invention is directed to an improvement in the containers for goods which are preserved by freezing in sealed containers such as cans.

In the frozen canned goods industry, the goods—such as fruits and vegetables—are sealed in cans without being sterilized and are immediately frozen; the goods remaining in proper condition for use as long as the sealed can remains frozen.

The principal object of the present invention is to provide the can with exteriorly visible means arranged to indicate to a purchaser that the contents of the can have remained frozen from the time the goods were initially canned to the time of purchase. In this manner, the purchaser is advised that by no chance have the frozen canned goods accidentally thawed and been refrozen; an occurrence which is very undesirable as the goods might become unedible during the unfrozen period.

Another object of the invention is to provide an indicator for frozen canned goods, and for the purpose described, which includes a relatively small but exteriorly visible ice cake which remains frozen only as long as the contents of the can are frozen; the resulting liquid escaping from association with the can when such ice cake melts.

A further object is to provide an indicator, as in the preceding paragraph wherein the ice cake is positioned and formed of such a liquid that when the ice cake melts the resultant liquid flows over a portion of the can label and defaces the same.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
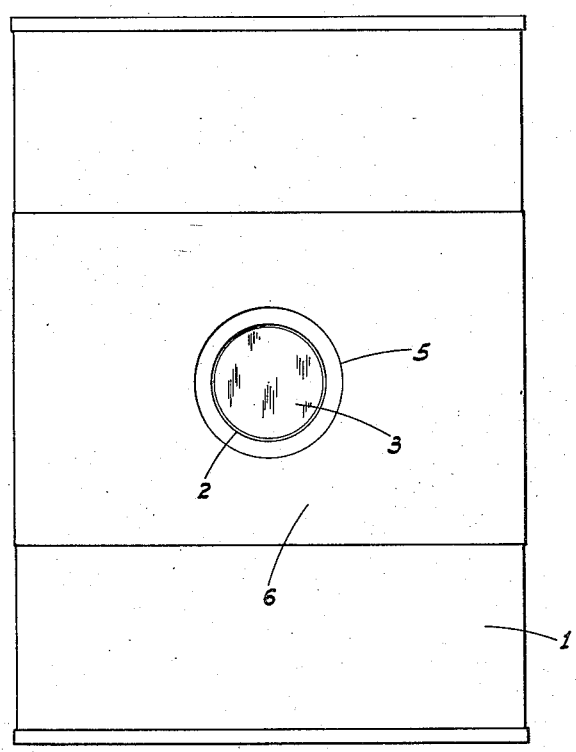
Figure 1 is a front elevation of a can embodying one form of the invention.
Figure 2:
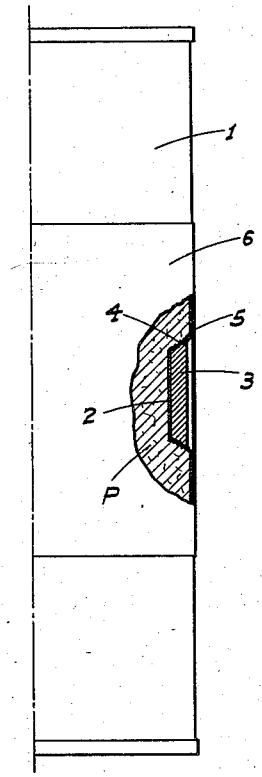
Figure 2 is a fragmentary side elevation, partly in section, of the can shown in Fig. 1.

Referring now more particularly to the characters of reference on the drawing, and at present to the embodiment of the invention shown in Figs. 1 and 2, the numeral 1 indicates a metallic can of common form. The product P in the can is quick frozen as soon as sealed therein and must remain frozen until the product is sold.

A reservoir or cup 2 is formed in the side of the can intermediate its top and bottom and faces outwardly. A quantity of freezable liquid is placed in such cup and frozen as an ice cake 3; this being accomplished either at the time the contents of the can are frozen or immediately thereafter. In order to prevent accidental escape of the ice cake, the sides of the cup 2 are corrugated or creased annularly as at 4.

As long as the ice cake 3 remain in place in the cup, a purchaser knows that the goods in the can are in proper and edible condition as such goods could not have thawed without the ice cake melting and the liquid escaping. In those instances where a label 6 is applied to the can and the cup is within the confines of the area of such label, the label may be formed with a window 5 which is disposed in register with the cup 2 whereby the ice cake 3 is visible.

If desired, the ice cake may be formed from a liquid containing a vivid coloring matter or a chemical, either of which will deface the label should the ice cake melt and the liquid run from the cup onto said label. This would serve as a positive indication and warning to a prospective purchaser that the goods were thawed or had thawed and been refrozen. The liquid however may be so colored, for better visibility, even if the label is not used.

Figure 3:
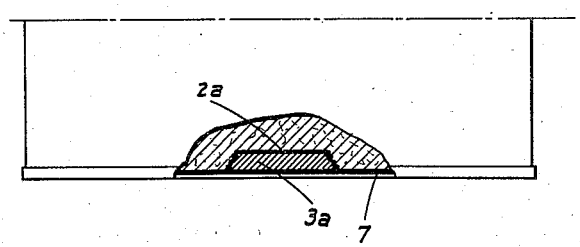
Figure 3 is a fragmentary elevation, partly in section, of a can embodying another form of the invention.

In the form of the invention shown in Fig. 3, the cup 2a is formed in one end of the can as in the bottom 7. Should the ice cake 3a melt, the resulting liquid immediately escapes as is desired and indicates that the goods have not been continuously frozen from the outset. While this embodiment of the invention does not include the feature of defacing the label, it does have certain advantages in that the cup could be formed more readily and the formation of the ice cake therein accomplished with greater facility than in the previously described embodiment.

In essence, the invention may be carried out, regardless of the position of the cup and ice cake on the can, as long as the ice cake is visible to a purchaser or the cup and ice cake are so arranged that the liquid—if the cake melts—discolors or defaces the label.

Figure 4:
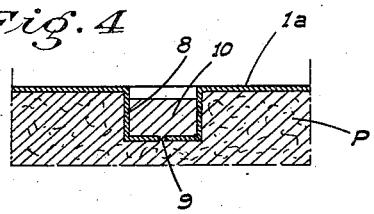
Figure 4 is a fragmentary section of a can showing a combination indicator and safety seal.

In the form shown in Fig. 4, a relatively deep cup or well 8 is depressed into the can 1a instead of the shallow cup 2; said well having a bleed hold 9 in the bottom. This well is adapted to contain a liquid 10 of the same nature or material as the product P within the can, so that the latter will not be damaged by contact with said liquid.

In this manner, a visible indicator is provided, as well as a safety seal, for if the normally frozen product P should melt (and of course the frozen liquid 10 also), the bleed hole 9 is exposed to the atmosphere and air can gain access to the interior of the can. This would of course break the vacuum and prevent botulism, which will only occur in a relative vacuum.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination with a can for frozen goods and having a label thereon, a reservoir open to the exterior of the can, an ice cake in said reservoir, and a label defacing ingredient in said ice cake; the reservoir being disposed on the can in such position that liquid resulting from melting of the ice cake will flow onto said label.

2. A combination as in claim 1 in which the reservoir is disposed within the area covered by the label.

3. A combination as in claim 1 in which the reservoir is disposed within the area covered by the label; the label having an opening in register with said reservoir.

4. In the combination of a can having frozen goods therein, a cup formed in the can and open to the exterior thereof, and an ice cake frozen in said cup; said cup having a bleed hole initially opening from the cup into the interior of the can, said bleed hole normally being sealed by the ice cake.

5. A device as in claim 4 in which the bleed hole is in the bottom of the cup, and in which the cup is of substantial depth.

6. A device as in claim 4 in which the ice cake is formed from a material harmless to the contents of the can.

STANLEY F. TRIPLETT.